(12) United States Patent
Xu

(10) Patent No.: US 8,776,728 B2
(45) Date of Patent: Jul. 15, 2014

(54) EDIBLE PET CHEW

(75) Inventor: Guangqiang Xu, Shanghai (CN)

(73) Assignee: Shanghai Sunlight Electric Weighing Apparatus Co., Ltd., Shanghai (CN)

( * ) Notice: Subject to any disclaimer, the term of this patent is extended or adjusted under 35 U.S.C. 154(b) by 17 days.

(21) Appl. No.: 13/052,113

(22) Filed: Mar. 21, 2011

(65) Prior Publication Data
US 2012/0234259 A1 Sep. 20, 2012

(51) Int. Cl.
*A01K 29/00* (2006.01)

(52) U.S. Cl.
USPC ............................. 119/710; 119/709; 119/711

(58) Field of Classification Search
USPC ................. 119/709, 710, 711, 707, 174, 702; 426/635, 641, 805
See application file for complete search history.

(56) References Cited

U.S. PATENT DOCUMENTS

| | | | |
|---|---|---|---|
| 2,988,045 A * | 6/1961 | Fisher | 119/709 |
| 5,673,653 A * | 10/1997 | Sherrill | 119/709 |
| 7,677,203 B2 * | 3/2010 | Stern | 119/709 |
| 2007/0289552 A1 * | 12/2007 | Axelrod et al. | 119/710 |
| 2011/0262587 A1 * | 10/2011 | Stern et al. | 426/5 |
| 2011/0283955 A1 * | 11/2011 | Axelrod et al. | 119/710 |
| 2012/0079992 A1 * | 4/2012 | Chen et al. | 119/710 |

* cited by examiner

*Primary Examiner* — Trinh Nguyen
(74) *Attorney, Agent, or Firm* — Raymond Y. Chan; David and Raymond Patent Firm

(57) ABSTRACT

An edible pet chew for pets primarily dogs has a chewy sheet of meat based material. The "meat based" chewy sheet imitates the chewy property and chewing function of known rawhide sheet and thus substitute the "meat based" chewy sheet for the known rawhide sheet to form a pet chew. In order to achieve the "chewy" property, a necessary additive is used to form the "meat based" material. The "meat based" chewy sheet is then formed to pet chews with various shapes and structures as known rawhide sheet is. A second aspect of present invention is that, wrapping another member of "edible chewable material", preferably chicken jerky into the "meat based" chewy sheet to further enhance attraction or nutrition to dogs. A third aspect of present invention is that, instead of chewy sheet, a three-dimensional-shape chewy mass is introduced wrapping or containing another member of "edible chewable material" preferably chicken jerky in the chewy mass member.

19 Claims, 14 Drawing Sheets

EDIBLE PET CHEW

BACKGROUND OF THE PRESENT INVENTION

1. Field of Invention

The field of this invention relates to an Edible Pet Chew.

2. Description of Related Arts

Domestic pets, primarily dogs, have an instinct to chew which keeps their teeth healthy, exercises their jaws and teeth and keeps teeth clean. "Pet Chew" products have been introduced to the market for many years to accommodate that instinctive urge to chew in a healthy direction.

"Pet Chews" are intended to be chewed by a pet/dog for an extended period of time, being distinguished from "pet treats". "Pet treats" are intended to be chewed by a pet/dog for a relatively short period of time and digested.

One existing important category of a typical Edible "Pet Chew" is the ones that are made of animal skin, for example Rawhide/Porkhide sheet. Of these types of pet chew, "rawhide sheet" is a commonly used material which is thin, chewy, malleable and long-lasting for chewing. With these excellent properties/characteristics, "rawhide sheet" is extremely extensively used to produce dog chews in existing market creating thousands of "rawhide" dog chew products. One specific such pet chew is disclosed in U.S. Pat. No. 2,988,045 to Fisher. This pet chew includes a rolled and knotted sheet of rawhide resembling a bone shape. To make the bone shape, a sheet of wet rawhide is rolled into a cylindrical form, and while the rawhide is still wet, two the ends are knotted to simulate an animal joint. Then the rolled and knotted rawhide is dried and hardened.

Pet Chew consisting solely of rawhide/porkhide sheets may be chewed for sufficient long time and can be digested. However, many dogs find these pet chews lack of substantial flavor and scent. Accordingly, many dogs lose interest with these rawhide pet chews after a while and will at most only chew on them for short periods of time. Some existing products consisting solely of rawhide/porkhide are improved by adding additional flavorings, for example artificial peanut flavor, into the rawhide after it is hardened, but it can not improve the palatability of rawhide significantly.

U.S. Pat. No. 5,673,653 discloses an edible pet chew wrapping jerky with rawhide, so as to attract pets to chew. It finds a good way to make the pet chews made of rawhide/porkhide sheet quite attractive to pets/dogs, improving its palatability to pets. But since it still has a big member of rawhide/porkhide in the finished products as outer layer, it unfortunately is not thought to overcome the other two disadvantages that rawhide/porkhide have as described below.

The other two disadvantages of Pet Chew consisting of solely or partially rawhide/porkhide are as follows. Firstly, environmental pollution. It is concerned by many people that manufacture of rawhide is relatively unregulated industry. Producing the raw material of rawhide is known to use a bunch of chemicals and therefore generate evident pollution during its splitting, cleaning, washing and bleaching processes. The water system may also be harmed and polluted accordingly. Secondly, detrimental residues in rawhide from primary processing. When primarily processing rawhide, lime solution, NH4CL, H2O2, and NaOH may be used during its splitting, cleaning, washing and bleaching processes and may remain in some finished products more or less. These chemicals are not good for pets' health. For example, excessive H2O2 will cause the pets vomit or even worse symptom. What's more, heavy metals, for example lead may also remain in the rawhide and accumulate in the body, which cause serious damage to the pets' health. These concerns encourage a perception for pets/dogs owners to look for alternative ways to provide a "pet chew" for a pet without the use of rawhide/porkhide.

In another category of "pet treat", there are animal meat product lines, typically, chicken jerky, pork jerky and beef jerky. It is known to all that pets, primarily dogs welcome meat jerky very much. The range may cover dried products, including animal meat, such as chicken, pork, beef, duck meat, goose, turkey meat, poultry meat, fish and animal pizzle, animal viscera, such as liver, lung, and heart, etc. Typical processing of meat jerky is, simply obtain meat from slaughtered animals, add additives (for example salt, sugar, preservatives), then dry it. However, one disadvantage of these jerky products is, after meat being obtained from animals, inherent "inner structure" of the raw meat is not modified or changed before making the finished meat products, and therefore finished products can only present in a form of the original raw meat. As a result, the finished products have limited shapes/forms and can not be formed into various shapes welcome by the pets or the pet owners. Some of these jerky products are made of sliced meat, being sliced thin enough looking like a "sheet" and then added with simple additives (for example salt, sugar). But these "sheets" do not have the essential properties/characteristics that "rawhide" has. These jerky sheets are fragile, crisp, and not chewy, unlike rawhide. Therefore manufacturers do not use them to form the finished products that "rawhide sheet" is always formed to. Another disadvantage is, these meat lines are always classified as "pet treat", which means they are intended to be chewed by a pet/dog for a relatively short period of time before being fully digested, unlike "pet chews".

Some other pet chew manufacturers do modify the inherent inner structure of raw meat by for example grinding before forming them into finished products. But in following manufacturing steps, they do not add proper additives (for example, proper thickeners, stabilizer, gelatinizer and emulsifier) into the ground meat material. Therefore the manufacturers do not use them to form a "sheet" like "rawhide" and they don't use them to make products that "rawhide" is always formed to. They even never think of or they don't know that ground "meat" composition with proper additives can be formed to a "sheet" simulating the characteristic and function of rawhide as a pet chew material.

U.S. Pat. No. 7,677,203 discloses an edible pet chew against U.S. Pat. No. 5,673,653, replacing the rawhide with a "plant based" material, so as to avoid pollution and health damage. However, since dogs are carnivorous, the plant based material does not attract pets much. Although flavoring can be added into the material, the edible pet chew is still less attractive to dogs since dogs do not prefer vegetal material. Furthermore, compared to plant based food, bodies of the pets, especially dogs, more fit nutrition provided by animal based food, and their digestive system more fits animal based food, such as meat. Therefore, the "plant based" edible pet chew is not considered to be so sufficient to pets' health. Another existing pet chew made from plant material is the one made from a molded wheat based material with glycerin, gelatin, monoglycerides of edible fatty acid and natural flavor. It also contains chlorophyll intending to improve dogs' breath. This molded plant material composite is molded into an elongated shape with one end shaped like a toothbrush head and an opposite end shaped like an epiphysis i.e. end of a long bone. However, this pet chew formed from main ingredients of plant also has the same foresaid disadvantages.

Accordingly, what is needed is an improved Edible Pet Chew that is formed from "meat based material" sheet simulating the property and function of rawhide/porkhide sheet, which is chewy and long-lastingly chewing for pets/dogs. It is needed to overcomes the problems and disadvantages of the prior art.

SUMMARY OF THE PRESENT INVENTION

An objective of the present invention is to create an edible pet chew for domestic pets, e.g., dogs, which overcomes the drawbacks of existing pet chews.

Another objective of the present invention is to provide an edible pet chew formed from long-lasting chewy sheet for dogs stimulating the property/characteristics/functions of known rawhide but with different materials intending to satisfy dogs' instinctive urge to chew, exercise their jaws and reduce the tartar on teeth of the dogs while chewing it.

Another object of the present invention is to provide an edible pet chew formed from an edible chewy sheet replacing the use of rawhide, which is processed in a friendly pattern to the environment, so that no pollution is produced during processing.

Another object of the present invention is to provide an edible pet chew form from an edible chewy sheet replacing the use of rawhide, which is safe for the pets without harmful residues for example heavy metal residues in finished products, so that the pets' health will not be harmed by ingesting the edible pet chew.

Another object of the present invention is to provide an edible pet chew, which can present various forms and shapes to enhance fun for pets/dogs, and provide more attractions and choices for the pet owners.

An objective of the present invention is to provide a "meat based" edible pet chew, which has considerable meat content in its formula and which is long-lasting for the pets to chew on for a substantially long time before ingesting it.

An objective of the present invention is to provide a "meat based" edible pet chew, which has considerable meat content in its formula which provides inherent strongly-attractive taste, scent and smell to dogs, and thus continuously encourages them to chew on.

An objective of the present invention is to provide a "meat based" edible pet chew, which has considerable meat content in its formula and thus fits digestive system of the pets, so that the pets can obtain sufficient nutrition from the edible pet chew.

In one aspect of the edible pet chew of the present invention, a long-lasting chewy sheet is formed from "meat based" material composition, simulating the property and function of existing rawhide/porkhide and substituting rawhide/porkhide. And then the "meat based" sheet further forms a pet chew with various shapes and structures.

In another aspect of the edible pet chew, another "edible chewable material" is wrapped, rolled about or positioned within by said long-lasting chewy sheet formed from "meat based" material composition. With the additional "edible chewable material" wrapped therein, enhanced attraction/appeal and nutrition to dogs is created.

In yet another aspect, different from said chewy sheet wrapping, rolling about an edible chewable material, a member of three-dimensional-shape chewy mass is formed to a pet chew with additional edible chewable material distributed, positioned or wrapped in said chewy mass. Said three-dimensional-shape chewy mass is formed from meat based material. With the additional "edible chewable material" positioned therein, enhanced attraction/appeal and nutrition to dogs is created.

BRIEF DESCRIPTION OF THE DRAWINGS

Reference now is made to the accompanying drawings in which.

DETAILED DESCRIPTION OF THE PREFERRED EMBODIMENT

The embodiments of present invention shown in FIG. 1 through FIG. 10 are formed by chewy sheets comprising "meat based" material which replaces the use of existing known material of rawhide sheet wherein rawhide is used to form a pet chew. The term of "chewy" in this invention is defined as a material that is long-lasting for chewing or can be chewed by a pet for a long time before being ingested by the pet. Since pets, primarily dogs, are extremely more appealed/attracted by meat than rawhide, pet chews made of meat based material sheet have an obvious advantage in palatability versus the ones made of rawhide. Furthermore, the sheets with "meat based" material are particularly processed making it long-lasting for pets to chew on. In the last heating process, the "meat based" material pet chew is hardened to a proper rigidity and strength which make the pet chew long lasting for pets to chew and satisfies the pets, primarily dogs' inherent urge of chewing.

Preferably, to form a chewy sheet, said meat based material comprises meat ingredient, additive and filler. Said meat ingredient is formed by grinding raw meat when it is still wet. The additive and filler ingredients are used to make the "meat based material" composition in sufficient strength and flexibility for manipulating such as such as forming, molding, rolling, folding, flexing, knotting, pressing and etc and make dried finished products formed from said chewy sheet in a proper rigidity and strength providing long-lasting chewing property for dogs.

Figure 1:
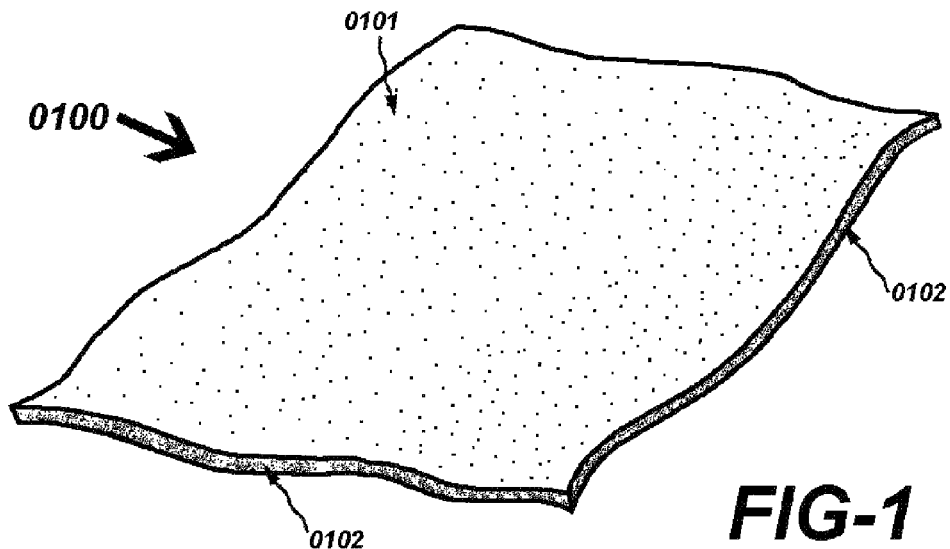
FIG. 1 is a top plan view of a primary large chewy sheet formed from meat based material preparing to be cut to smaller sheets to form edible pet chews of the present invention.

Now refer to FIG. 1. An embodiment of chewy Sheet 0100 formed from a molded, rolled or extruded "meat based material" composition. The composition for example comprises chicken, mixed with additives and fillers such as glutinous rice flour, gelatin, Soy Protein Isolate, Glucose Syrup, glycerin, Sodium Pyrophosphate and preservative(s). It should be noted that the term "meat based" material as used in present invention is defined as the material whose formula comprises at least 1/3 (one third) "meat ingredient" in proportion by weight. The term of "Meat ingredient" in present invention is defined as animal ingredients selected from the group consisting of: animal meat, such as chicken, pork, beef, duck meat, goose, turkey meat, poultry meat, fish; animal pizzle; animal viscera, such as liver, lung, and heart; animal fat. Furthermore with the definition of the term "meat based" material, in order to ensure inherent appealing taste and scent for pets (primarily dogs) to chew, the "meat ingredients" in this term need account for the largest proportion in the formula by weight versus any other individual non-meat materials; and furthermore with the definition of the term "meat based material", "plant ingredient" (for example corn, potato, wheat, rice, gluten, etc) if applicable, need account to less than 1/2 (one twice) in the formula by weight of "meat based" material, so as to ensure the pet chew of present invention maintain their inherent appealing to dogs since dogs prefer "meat" ingredients than all others.

Except "meat ingredients", the total weight of all other "non-meat" ingredients of "meat based" material, for example glutinous rice flour, gelatin, Soy Protein Isolate, Glucose Syrup, glycerin and Sodium Pyrophosphate in this case may be in a small percentage, for example 15% by weight, to provide a proper rigidity, chewability, malleability, moldability, extrudability, and formability. Other additives and fillers for the "meat based material" composition may be substituted for the above mentioned additives and fillers as long as the additives and fillers can have the "meat based material" in a proper strength and flexibility for manipulating such as forming, molding, rolling, folding, flexing, knotting, pressing and etc in an initially malleable manner and can have the "meat based material" be eventually hardened by heat or drying into a properly hard but long-lasting chewing manner. The Chewy sheet 0100 may be formed by, for example, molding, extrusion, pressing, rolling or injection molding, etc. Since Chewy sheet 0100 has a high content of meat ingredient in its formula, pet chews made of it can well attract pets/dogs to chew on them for a long time.

Preferred proportion of said "meat ingredients" in the formula of "meat based material" is 50% to 95% by weight. And said "meat ingredients" in this invention is formed from raw meat whose original inner structure is modified wherein modifying said raw meat is embodied as for example grinding the raw meat slaughtered from animal in order to change the original structure/form of the raw meat. As an example of processing of said modifying inner structure, raw meat is cut from an animal; then grind the raw meat when it is wet to destroy the original inner structure of it. The raw meat is ground to a slurry status and thus "raw meat modified with its original inner structure" is prepared for following processing steps to make a pet chew.

The "non-meat" ingredients as mentioned above such as glutinous rice flour, soy protein isolate, gelatin, glycerin and Sodium Pyrophosphate are jointly serving as humectants an/or thickeners and/or stabilizer and/or gelatinizer and/or binder and/or fillers, as additives or fillers. The additive and filler ingredients are used to make the meat based material composition in sufficient strength and flexibility for manipulating such as forming, molding, rolling, folding, flexing, knotting, pressing and etc and make dried finished products in a proper rigidity and strength providing long-lasting chewing property for dogs.

Alternatively, a small quantity of edible fiber or ground rawhide with premium quality may be added into the "meat based material" to obtain further flexibility and longer-lasting chewing time of finished products. However, the percentage of ground rawhide must be very low, for example 5% in formula, in order to make the products made herewith still within the scope and spirit of this invention.

As an alternative formula of an embodiment, the chewy sheet 0100 consists of chicken breast, glutinous rice flour, gelatin, Soy Protein Isolate, Glucose Syrup, Salt, Sugar, and preservative(s). Ingredient percentages of every ingredient are as follows: chicken breast (80.9%), glutinous rice flour (8%), gelatin (4%), Soy Protein Isolate (3%), Glucose Syrup (2%), Salt (1%), Sugar (1%), and preservative(s) (0.1%). In this formula, chicken breast is the sole meat ingredient accounting to larger than $\frac{1}{3}$ of the whole formula, 80.9% actually. Total weight of "plant" ingredients in this case is lower than $\frac{1}{2}$ in the formula, actually 11% (glutinous rice flour+soy protein isolate).

As another alternative formula of an embodiment, the chewy sheet 0100 consists of chicken breast, glutinous rice flour, glycerin, pork, carrageenan, Corn, Sorbitol, chicken liver, Cattle Pizzle, Salt, Sugar, xanthan gum, Sodium Pyrophosphate, and preservative(s). Ingredient percentages of every ingredient are as follows: chicken breast (20%), glutinous rice flour (20%), glycerin (10%), pork (10%), carrageenan (10%), Corn (8%), Sorbitol (6.6%), chicken liver (4%), Cattle Pizzle (1%), Salt (2%), Sugar (3%), xanthan gum (5%), Sodium Pyrophosphate (0.3%), and preservative(s) (0.1%). In this formula, chicken breast, pork, chicken liver and cattle pizzle are the "meat" ingredients. Total weight of all the "meat" ingredients accounts to larger than $\frac{1}{3}$ of the whole formula, 35% actually. Total weight of "plant" ingredients in this case is lower than $\frac{1}{2}$ in the formula, actually 28% (glutinous rice flour+corn).

It is recognized that the length, width, and thickness of the Chewy Sheet 0100 may vary as desired to obtain pet chews of different sizes, shapes, configurations. The size or area of the Chewy Sheet 0100 of FIG. 1 may be various according to predetermined request. The Sheet 0100 is divided/cut into small pieces in shape of rectangle or other specific shapes for further forming the desired products. The thickness of the sheet 0100 may be various as well according to predetermined request, resembling actual known rawhide or porkhide.

A preferred manufacturing process for a typical embodiment of present invention to make an end product is as follows. 1st step, prepare animal meat, for example frozen chicken breast, defrost the meat and then modify the inner structure of the meat by grinding it. 2nd step, form the "meat based" material composition by mixing the ground meat from first step with glutinous rice flour, gelatin, soy protein isolate, glucose syrup, glycerin, salt, sugar and potassium sorbate. 3th step, get said composition into a sheet-shaped mold to form a rectangular sheet of "meat based" composition in primarily larger size. 4th step, dry the "meat based" composition sheet by heating at 45° C. to 50° C. for around 5 hours. The aim of this drying step is to maintain the initial flat "sheet" shape and structure of the composition, and to harden the "sheet" to a proper strength and flexibility to enable further manipulating such as knotting, flexing and folding. 5th step, cut smaller rectangular pieces in predetermined size from the larger sheet prepared in step 4. Fold the sheet and then tie 2 ends of the sheet to form the structure and shape of end products simulating a bone. 6th step, heat the product at 75° C. to 85° C. for around 2 hours. The aim of this heating step is to further harden the products in a manner that makes the product long-lasting for chewing but still be chewable.

0101 in FIG. 1 represents the surface of chewy sheet 0100. 0102 in FIG. 1 represents the both longitudinal and latitudinal sides of chewy sheet 0100.

Figure 2:
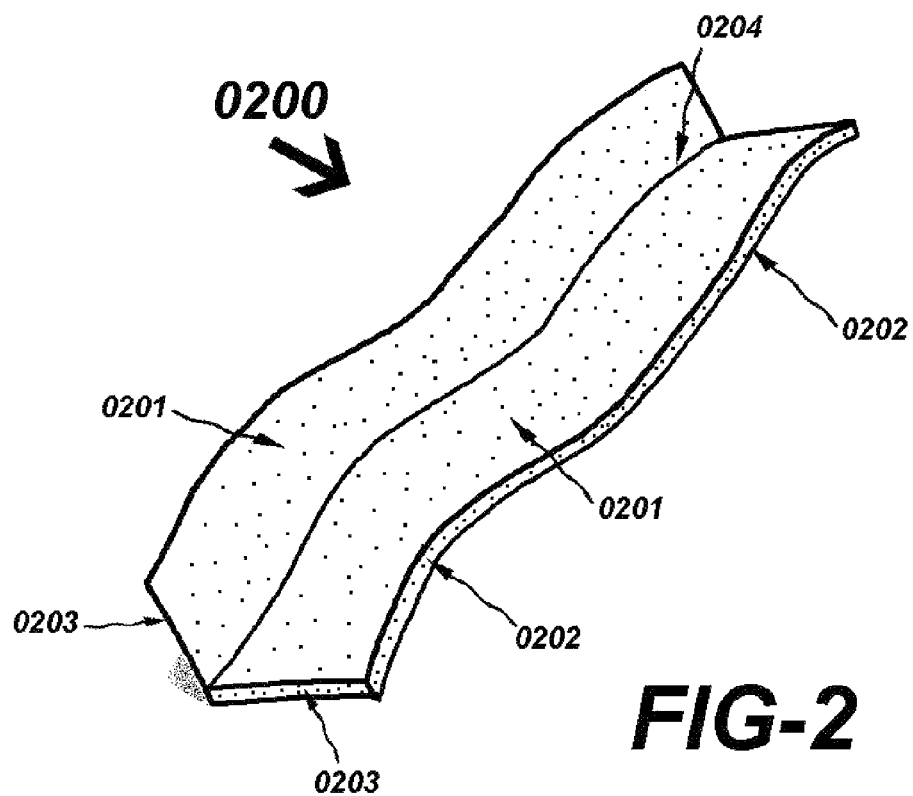
FIG. 2 is a top plan view of a smaller chewy sheet cut from the large chewy sheet of FIG. 1. The smaller chewy sheet to be folded is a further preparation to form edible pet chews of the present invention.

As shown in FIG. 2. A smaller Chewy sheet 0200 is created by cutting Sheet 0100 into small pieces. Fold Sheet 0200 approximately at the half line 0204. In FIG. 2, 0201 represents the surface of the small sheet 0200 cut from 0100. 0202 and 0203 are respectively longitudinal and latitudinal sides of the small sheet 0200.

Figure 3:
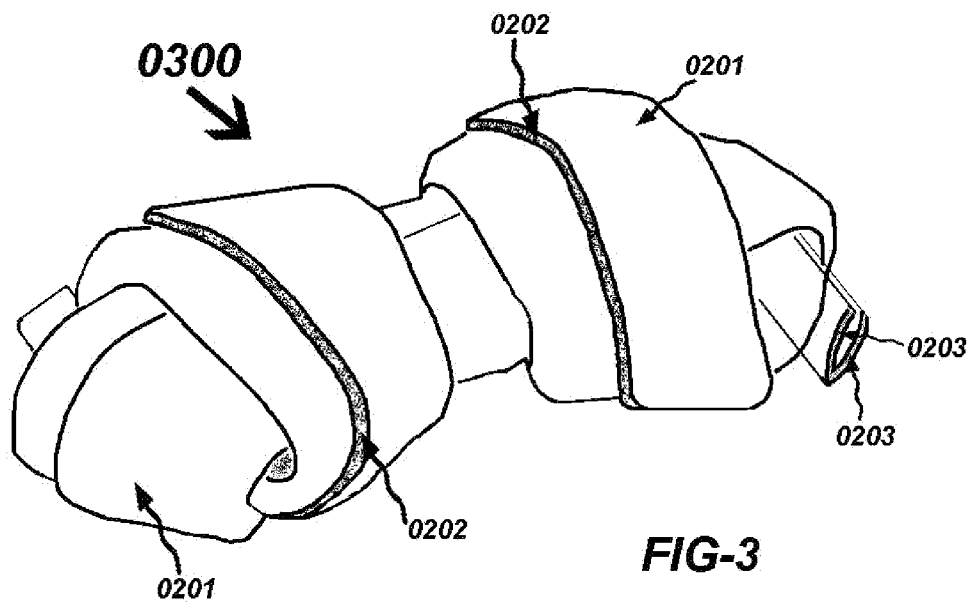
FIG. 3 is an elevational view of an embodiment of a pet chew formed from the folded chewy sheet of FIG. 2 to have two knotted ends looking like the two epiphyses of a real bone with a diaphysis in the middle.

As shown in FIG. 3, an embodiment of present invention. An alternate shaped Pet Chew 0300 is formed simulating a bone. With said additive or filler as mentioned above, it enables folded sheet 0200 to be shaped to pet chew 0300 as desired by further manipulating. Processes are, get the folded Sheet 0200 of FIG. 2 ready. Tie the two longitudinal ends of the folded sheet 0200 to make a simulation of two epiphyses of a real bone with a diaphysis in the middle. Finished products of pet chew 0300 formed from "meat based material" sheet 0100 has a high content of meat which attracts pet/dogs to chew on with its inherent smell and taste. With said additive or filler as mentioned above, it enables pet chew 0300 to be hardened to a long-lasting for chewing manner which makes dogs chew for a long time before they completely digest it. The chewing activity can well exercise the dog's jaw, grind their teeth and remove tartar from their teeth.

Figure 4:
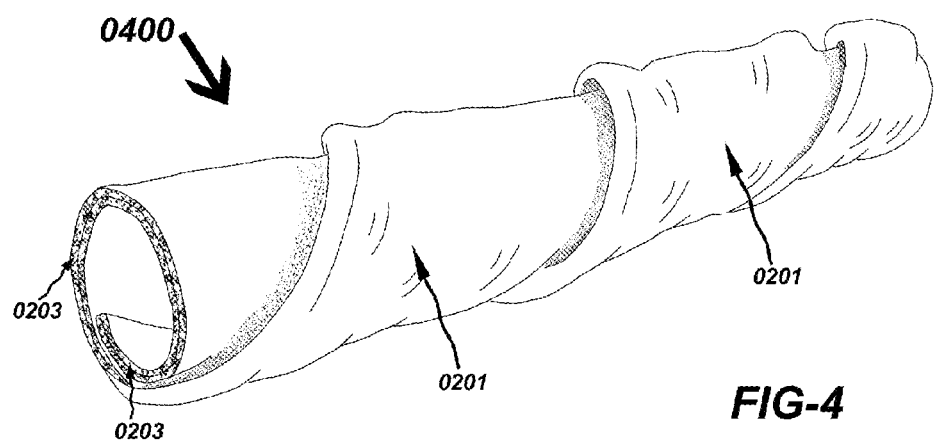
FIG. 4 is an elevational view of another embodiment of a pet chew formed from a properly-sized chewy sheet cut from the large chewy sheet of FIG. 1.

As shown in FIG. 4, an embodiment of present invention. An alternate shaped Pet Chew 0400 is formed looking like a twisted stick. Processes are, get the folded Sheet 0200 of FIG. 2 ready. Shape it by hand by twisting the sheet.

Figure 5:
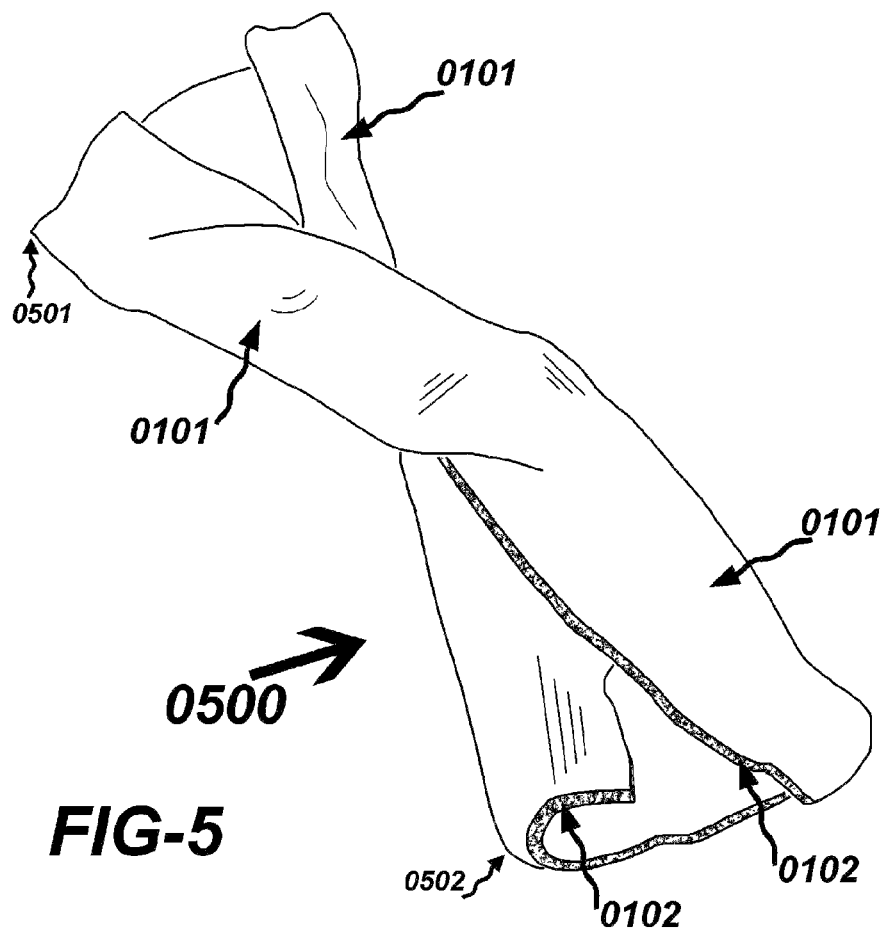
FIG. 5 is an elevational view of another embodiment of a pet chew formed from a properly-sized chewy sheet cut from the large chewy sheet of FIG. 1 resembling a bow tie.

As shown in FIG. 5, an embodiment of present invention. An alternate shaped Pet Chew 0500 is formed looking like a bow tie. Processes are, cut a small properly-sized rectangular sheet from Sheet 0100 of FIG. 1. Fold the small sheet longitudinally at the position of 0501 and 0502. Twist the folded sheet having it look like a bow tie.

Figure 6:
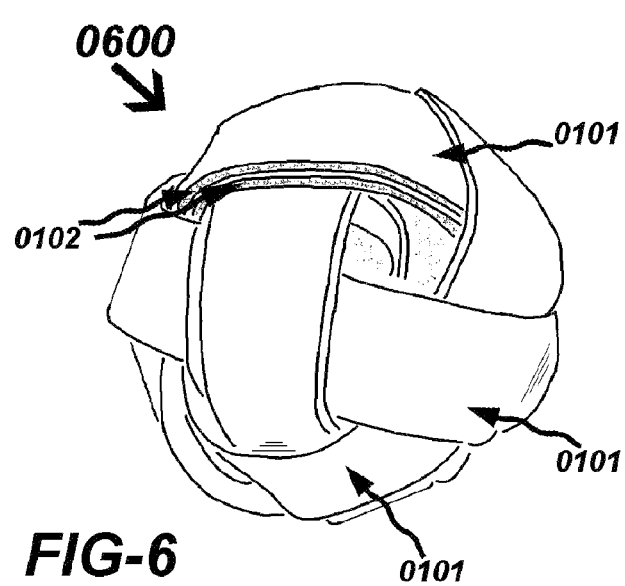
FIG. 6 is an elevational view of another embodiment of a pet chew assembled with a few pieces of properly-sized chewy sheets cut from the large chewy sheet of FIG. 1 resembling a ball shape.

As shown in FIG. 6, an embodiment of present invention. An alternate shaped Pet Chew 0600 is formed looking like a ball shape. Processes are, cut a number of small properly-sized rectangular sheets from Sheet 0100 of FIG. 1. Assemble the sheets to have it structured to a ball shell with hollow inside.

Figure 7:
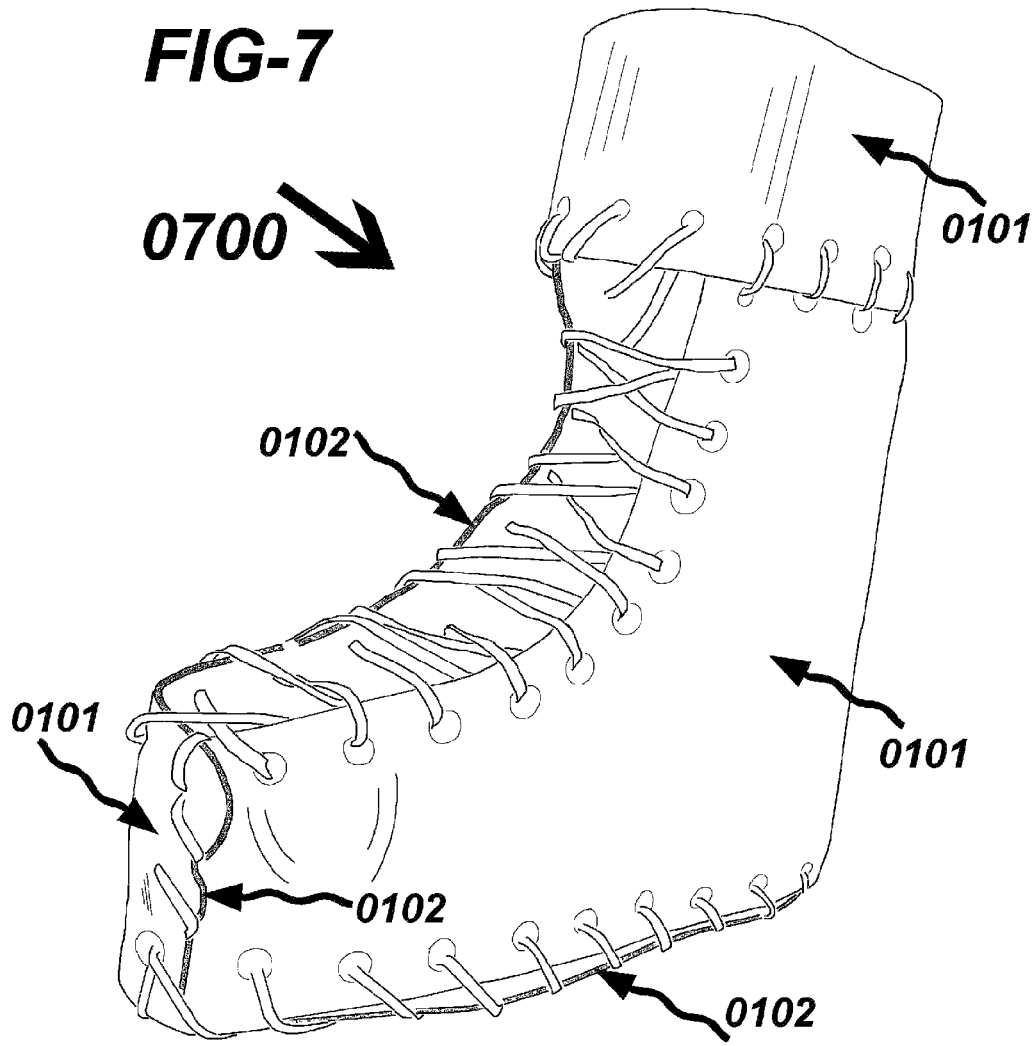
FIG. 7 is an elevational view of another embodiment of a pet chew assembled with three pieces of properly-sized particularly-shaped chewy sheets cut from the large chewy sheet of FIG. 1 resembling a boot.

As shown in FIG. 7, an embodiment of present invention. An alternate shaped Pet Chew 0700 is formed looking like a boot. Processes are, cut three small properly-sized particularly-shaped sheets from Sheet 0100 of FIG. 1 with a cutting machine. Assembly the three sheets with edible strings to form a boot shape.

Figure 8:
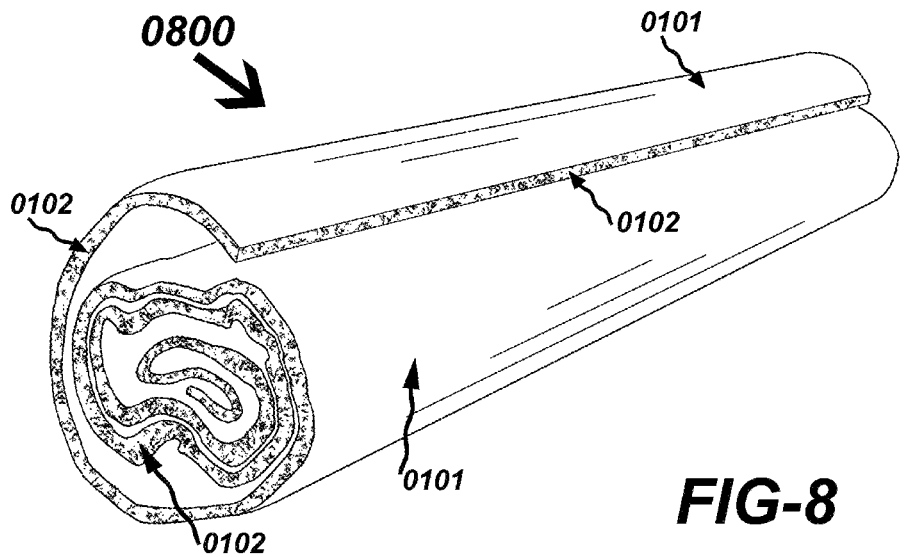
FIG. 8 is an elevational view of another embodiment of a pet chew formed from a properly-sized chewy sheet cut from the large chewy sheet of FIG. 1. The chewy sheet is rolled and pressed.

As shown in FIG. 8, an embodiment of present invention. An alternate shaped Pet Chew 0800 is formed looking like a stick. Processes are, cut a small properly-sized rectangular sheet from Sheet 0100 of FIG. 1. Roll the sheet to make a cylindrical stick. Put the rolled stick into a CYLINDER-shaped-cavity pressing mold and then press it. The aim of pressing is to make the product in a permanent structure and longer-lasting chewing for pets.

Figure 9:
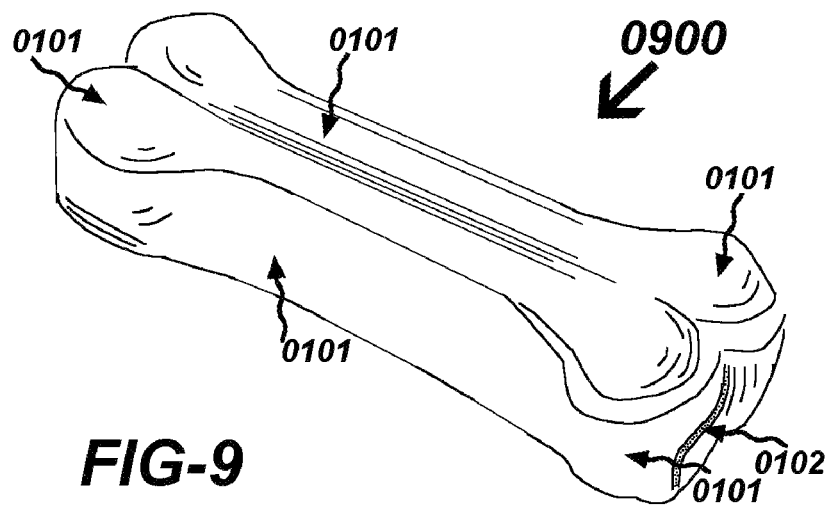
FIG. 9 is an elevational view of another embodiment of a pet chew formed from a properly-sized chewy sheet cut from the large chewy sheet of FIG. 1 resembling a bone shape. The chewy sheet is rolled and pressed.
Figure 10:
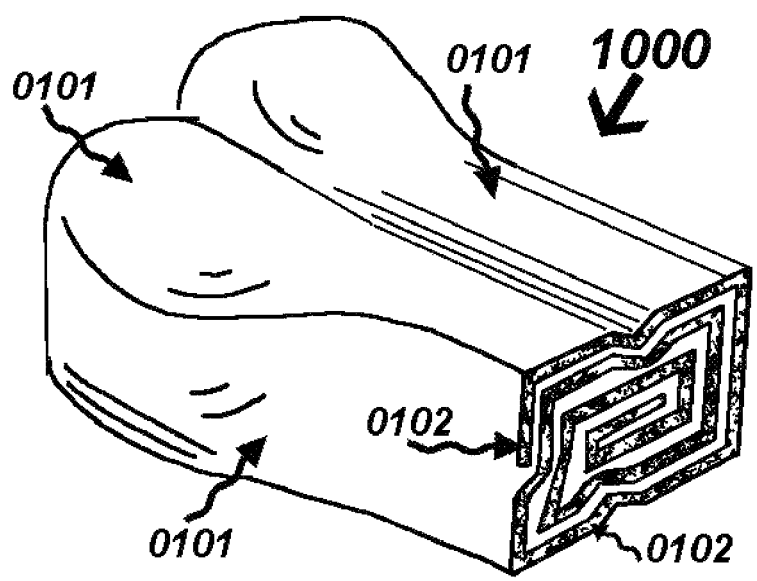
FIG. 10 is a cross-sectional view of the embodiment of FIG. 9

As shown in FIGS. 9 and 10, an embodiment of present invention. An alternate shaped Pet Chew 0900 is formed looking like a bone shape. Processes are, cut a small properly-sized rectangular sheet from Sheet 0100 of FIG. 1. Roll the sheet to make a cylindrical stick. Put the rolled stick into a BONE-shaped-cavity pressing mold and then press it making the product in a shape of bone. The cross-sectional view of the product is as shown in 1000 of FIG. 10.

Here comes another aspect of present invention as shown in FIG. 11 through FIG. 21 developing from within the scope and spirit of present invention. Due to the fact that the "meat based" sheet is not 100% meat, compared to pet chews made of almost 100% meat for example chicken jerky, it may reduce the palatability/attraction, to a small extent, for the pet chews made of "meat based" materials. In order to further improve this and make the products in present invention even more appealing, appetizing and more nutritious for pets/dogs, another "edible chewable material" is wrapped, rolled about or positioned within by "meat based" Chewy Sheet 1100 to enhance the appealing and nutrition of the pet chew for dogs. In this aspect, the "meat based" material chewy sheets serves as outer layer of the pet chew. Said another "edible chewable material" wrapped therein is preferred to be for example meat jerky or chicken jerky, which provides more appealing and appetizing urge for pets/dogs to chew. Said another chewable material wrapped inside the outer layer can be totally covered by the outer layer without exposure or partially exposed. The presence of another chewable material can highly encourage pets/dogs to chew and then eat starting with the outer meat based material before their reaching the inner "another chewable material". It's evident that the jerky wrapped therein has nearly 100% meat/chicken in its formula which is more appealing and appetizing for dogs than said meat based materials. Dogs will be more attracted by the chicken jerky wrapped therein to chew on the pet chew but they can't reach the jerky unless they ingest the "meat based material" outer layer. In this pattern, the pet chew of this aspect has consistent attraction to dogs during their chewing it.

It should be noted that the term "jerky" as used in present invention is defined as including "traditional jerky" and "kippered jerky". "Traditional jerky" as defined herein typically consists of chicken, pork, beef, turkey, fish, or another animal meat which is cut into strips. The sliced meat may be flavored using a flavoring and/or a marinade and be dried via a drying equipment, a smoker or another manner. "Kippered jerky" as defined herein comprises ground pieces of meat, chicken, turkey, fish, etc., and a filler. The composition is then be shaped in a manner and then dried to be a jerky.

Alternatively, said another "edible chewable material" wrapped therein may be flavored edible materials, which is appealing for pets/dogs. Preferably, said "edible chewable material" is selected from a group consisting of: dried or cured animal meat, such as chicken, pork, beef, duck meat, goose, turkey meat, poultry meat, fish; animal pizzle; animal viscera, such as liver, lung, and heart; animal fat; dried fruit, dried vegetable, dried carrot, dried sweet potato, biscuit; and meat jerky and chicken jerky.

Figure 11:
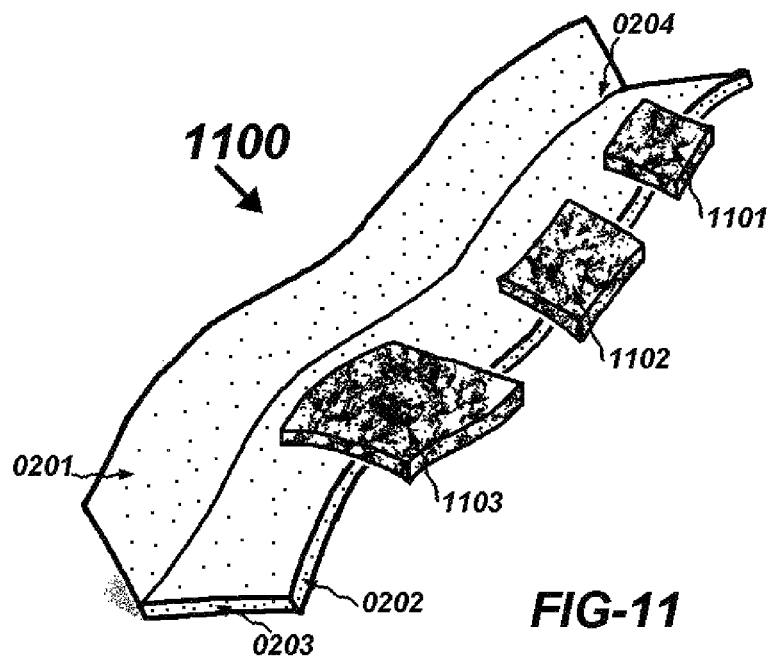
FIG. 11 is a top plan view of three individual pieces of jerky and a smaller chewy sheet of FIG. 2. The folded smaller chewy sheet wrapping said jerky in is a further preparation to form edible pet chews of the present invention.

As shown in FIG. 11. Under this aspect of present invention, three pieces of dried meat jerky or chicken jerky, 1101, 1102 and 1103 are positioned on the Chewy Sheet 0200. Positions of said 1101, 1102 and 1103 are as shown in FIG. 11. Fold Chewy Sheet 0200 approximately at the half line 0204.

Figure 12:
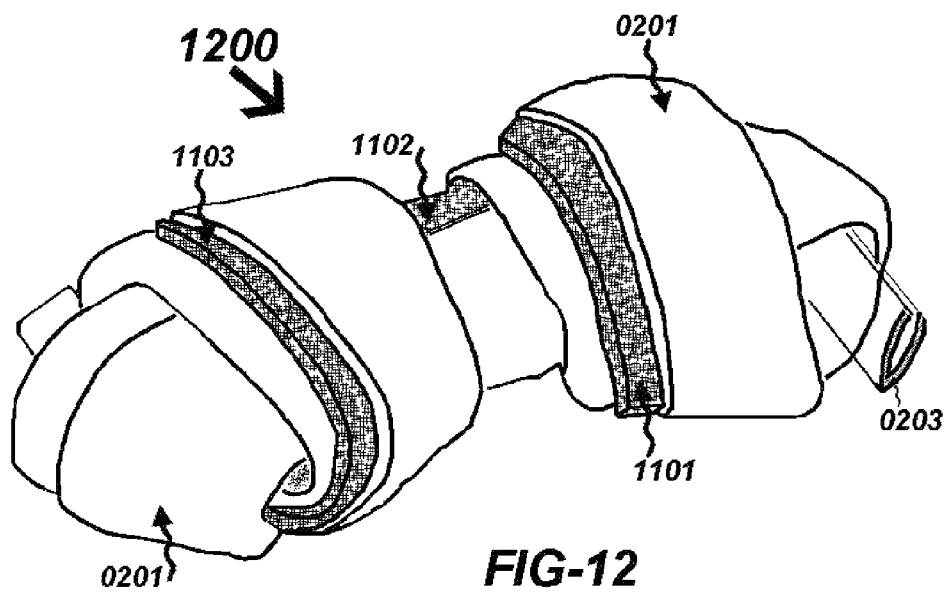
FIG. 12 is an elevational view of an embodiment of a pet chew formed from the folded chewy sheet with jerky of FIG. 11 to have two knotted ends to look like the two epiphyses of a real bone with a diaphysis in the middle.

As shown in FIG. 12, an embodiment of present invention. An alternate shaped Pet Chew 1200 is formed with said dried meat jerky or chicken jerky 1101, 1102 and 1103 simulating a bone. Processes are, get the folded Chewy sheet 1100 ready. Tie the two longitudinal ends of the folded sheet 1100 to make a simulation of two epiphyses of a real bone with a diaphysis in the middle. A small part of every Jerky 1101, 1102 and 1103 is preferred to expose on the outer layer of the pet chew 1200 which enable an easier appealing for dogs to chew. But alternatively, Jerky 1101, 1102 and 1103 may be covered thoroughly without any exposure by the outer layer of the pet chew. Since this pet chew has dried meat jerky inside, the smell and taste of dried meat jerky provides additional extreme urge for pets/dogs to chew on it for extended periods of time.

Figure 13:
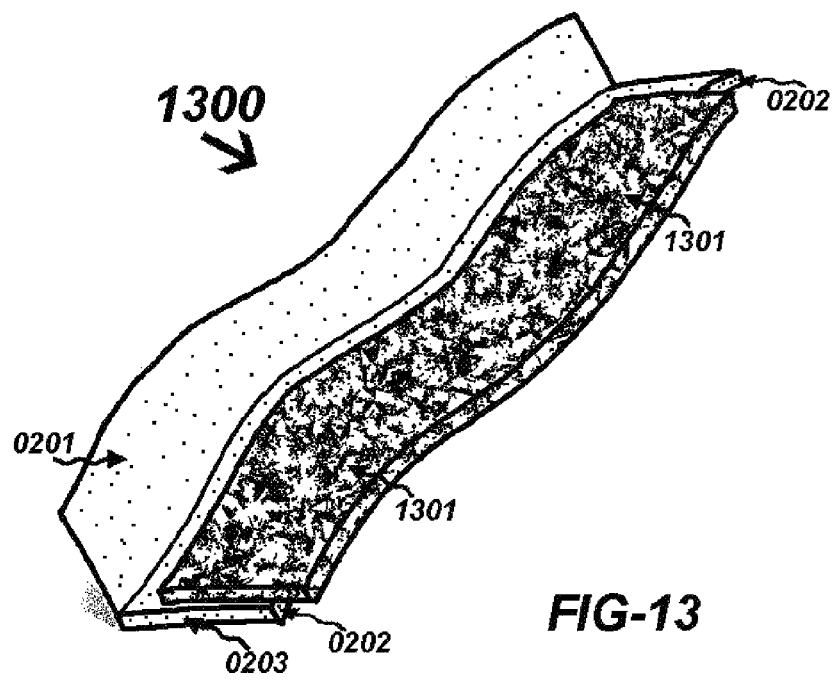
FIG. 13 is a top plan view of a single piece of jerky and a smaller chewy sheet of FIG. 2. The folded smaller chewy sheet wrapping the jerky in is a further preparation to form edible pet chews of the present invention.

As shown in FIG. 13. Similar to 1100 but instead of three pieces of jerky, only a larger single piece of dried meat jerky or chicken jerky 1301 is positioned on the Sheet 0200. Position of said 1301 is as shown in FIG. 13. Fold Sheet 0200 approximately at the half line 0204.

Figure 14:
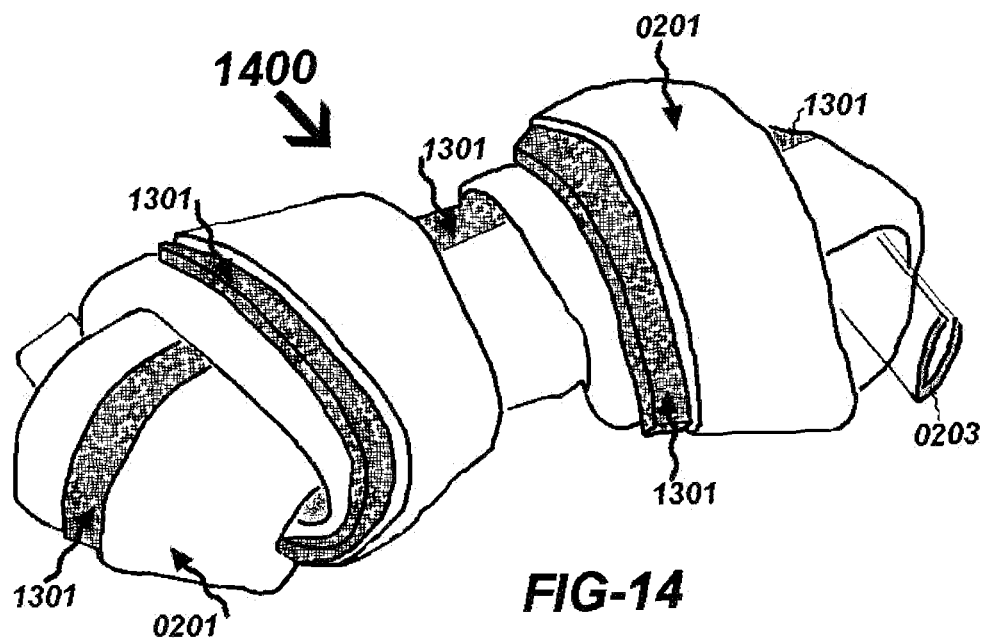
FIG. 14 is an elevational view of another embodiment of a pet chew formed from the folded chewy sheet with jerky of FIG. 13 to have two knotted ends to look like the two epiphyses of a real bone with a diaphysis in the middle.

As shown in FIG. 14, an embodiment of present invention. An alternate shaped Pet Chew 1400 is formed with said dried meat jerky or chicken jerky 1301 simulating a bone. Processes are, get the folded Chewy sheet 1300 ready. Tie the two longitudinal ends of the folded sheet 1300 to make a simulation of two epiphyses of a real bone with a diaphysis in the middle. A small part of Jerky 1301 is preferred to expose on the outer layer of the pet chew 1400 which enable an easier appealing for dogs to chew. But alternatively, Jerky 1301 may be covered thoroughly without any exposure by the outer layer of the pet chew.

Figure 15:
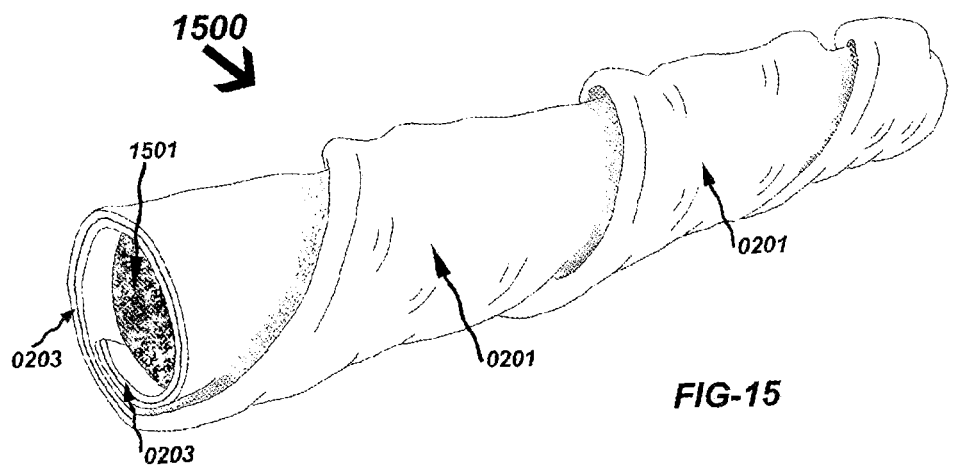
FIG. 15 is an elevational view of another embodiment of a pet chew formed from a properly-sized chewy sheet cut from the large chewy sheet of FIG. 1, wrapping in a stick-shaped flavored "edible chewable material" appealing to pets.

As shown in FIG. 15, an embodiment of present invention. An alternate shaped Pet Chew 1500 is formed looking like a twisted stick. Processes are, get the folded Sheet 0200 of FIG. 2 ready. Get a flavored edible material 1501 ready which is in a shape a cylindrical stick. Roll folded sheet 0200 longitudinally along the stick 1501 and wrap it in the sheet 0200. Form a twist stick with "meat based" material as outer layer and flavored edible material as the inner.

Figure 16:
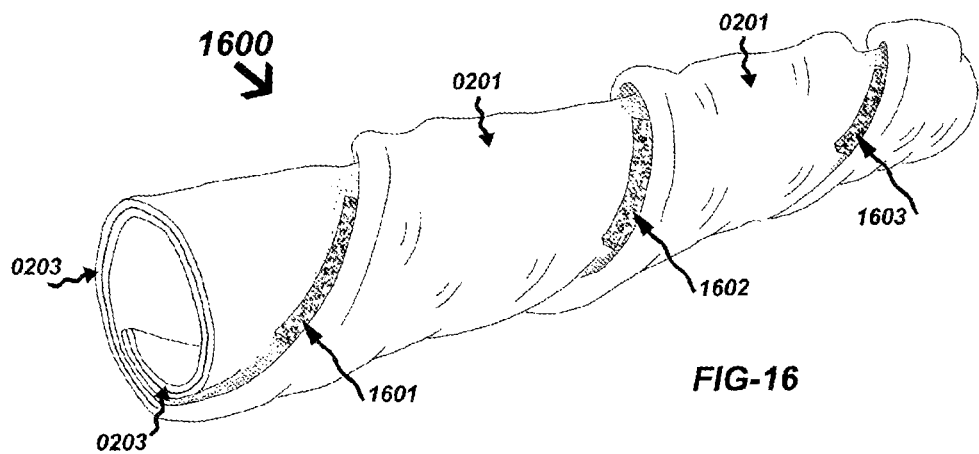
FIG. 16 is an elevational view of another embodiment of a pet chew formed from a properly-sized chewy sheet cut from the large chewy sheet of FIG. 1, wrapping in three individual pieces of jerky.

As shown in FIG. 16, an embodiment of present invention. An alternate shaped Pet Chew 1600 is formed looking like a twisted stick. Processes are, get the folded Chewy sheet 0200 ready. Get three pieces of meat jerky or chicken jerky, 1601, 1602 and 1603 ready. Twist the folded Sheet 0200 to shape it into a stick with hollow inner and when twisting it, wrap said three pieces of jerky 1601, 1602 and 1603 in the positions as shown in FIG. 16. A small part of every three jerky may be exposed as shown in FIG. 16 or not be exposed.

Figure 17:
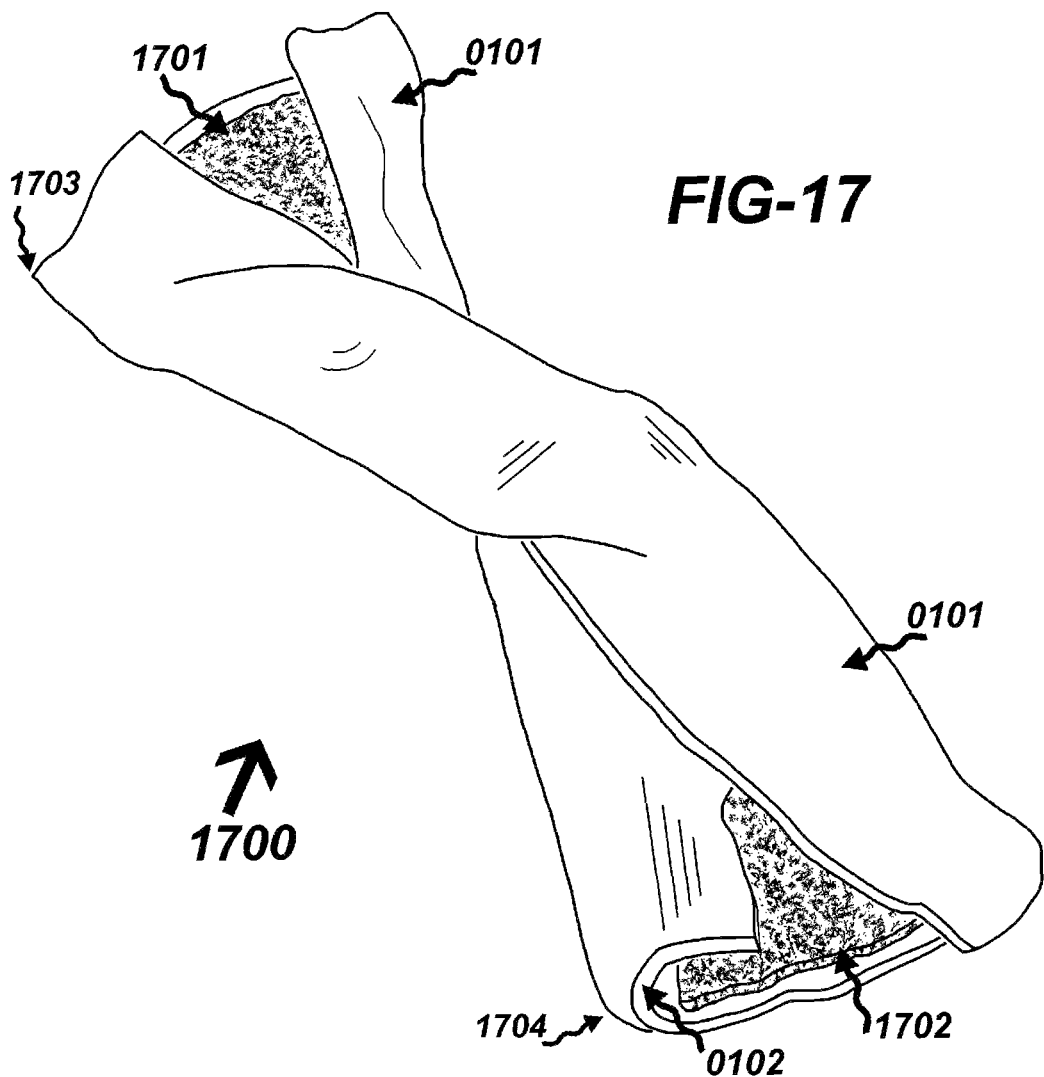
FIG. 17 is an elevational view of another embodiment of a pet chew formed from a properly-sized chewy sheet cut from the large chewy sheet of FIG. 1, resembling a bow tie, wrapping in two individual pieces of dried sweet potato chips.

As shown in FIG. 17, an embodiment of present invention. An alternate shaped Pet Chew 1700 is formed looking like a bow tie. Processes are, cut a small properly-sized rectangular sheet from Sheet 0100 of FIG. 1 and fold it longitudinally at the position of 1703 and 1704. Get two pieces of dried sweet potato chips, 1701 and 1702 ready. Put the two pieces of dried sweet potato on the two longitudinal ends of the small sheet respectively. Twist the folded Sheet with dried sweet potato having it look like a bow tie.

Figure 18:
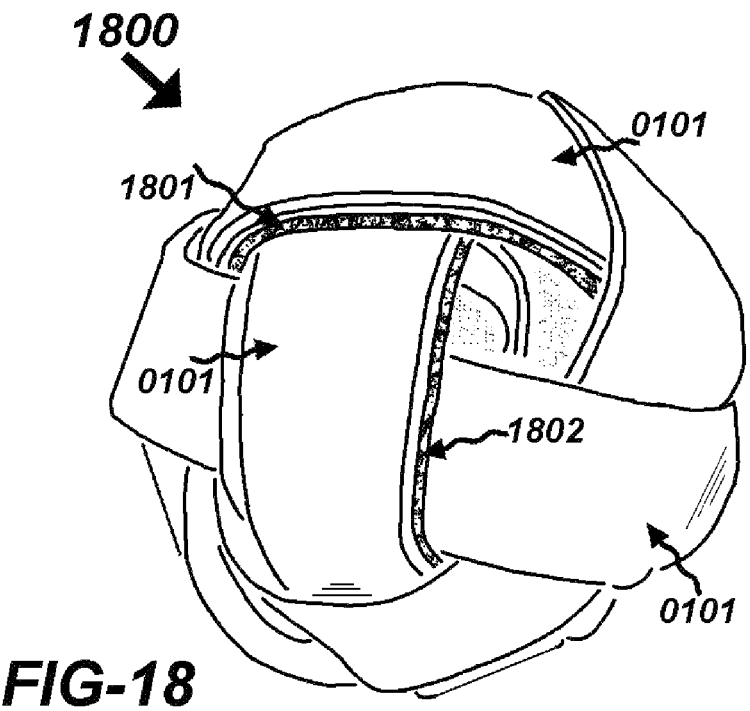
FIG. 18 is an elevational view of another embodiment of a pet chew assembled with a few pieces of properly-sized chewy sheets cut from the large chewy sheet of FIG. 1 resembling a ball shape, wrapping in four individual pieces of sheets of flavored edible chewy material appealing to pets.

As shown in FIG. 18, an embodiment of present invention. An alternate shaped Pet Chew 1800 is formed looking like a ball shape. Processes are, cut several small properly-sized rectangular sheets from Sheet 0100 of FIG. 1. Get four pieces of flavored edible chewy sheets ready (sheet 1801 and 1802 in this figure are two of said four edible chewy sheets). The four pieces of flavored edible chewy sheets here serves as "another edible chewable material" under this aspect of present invention. Assemble the small "meat based" sheets from 0100 and the four pieces of flavored edible chewy sheets together to have it structured to a ball shell with hollow inside. Position of 1801 and 1802 is as shown in FIG. 18.

Figure 19:
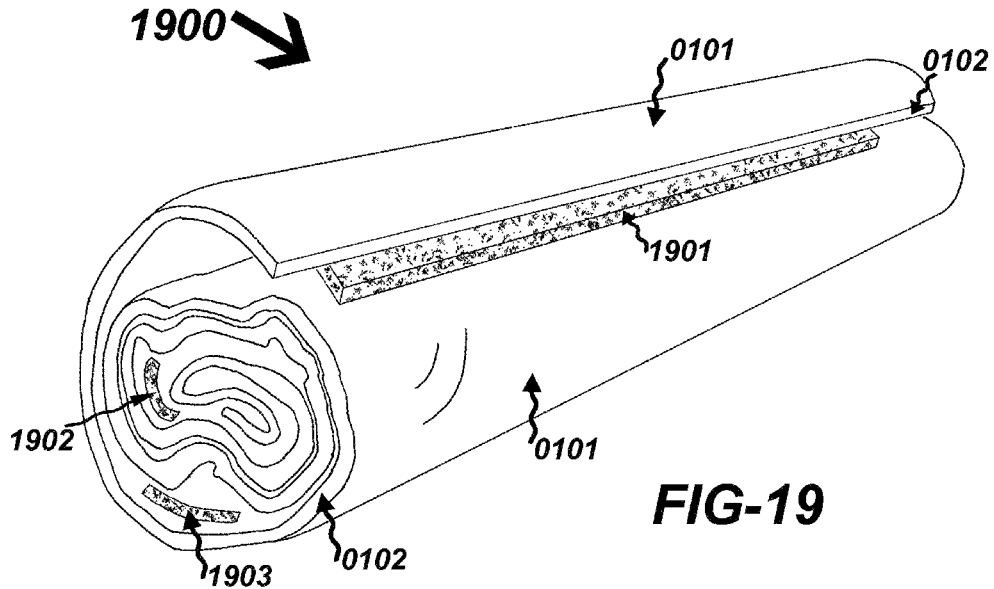
FIG. 19 is an elevational view of another embodiment of a pet chew formed from a properly-sized chewy sheet cut from the large chewy sheet of FIG. 1. The chewy sheet is rolled and pressed, wrapping in three individual pieces of jerky

As shown in FIG. 19, an embodiment of present invention. An alternate shaped Pet Chew 1900 is formed looking like a stick. Processes are, cut a small properly-sized rectangular sheet from Sheet 0100 of FIG. 1. Get three pieces of meat jerky or chicken jerky in proper size 1901, 1902 and 1903 ready. Put said jerky on the small sheet cut from sheet 0100.

Roll the sheet together with the jerky to make a cylindrical stick. Put the rolled stick into a CYLINDER-shaped-cavity pressing mold and then press it. The aim of pressing is to make the product in a permanent structure and longer-lasting chewing for pets. A small part of every three jerky may be exposed as shown in FIG. 19 or not be exposed.

Figure 20:
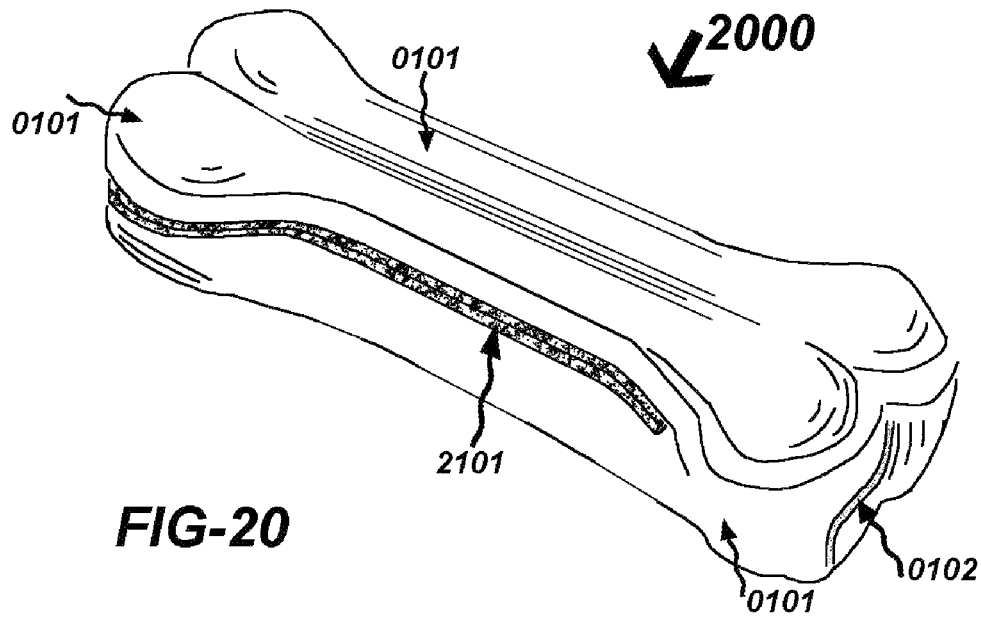
FIG. 20 is an elevational view of another embodiment of a pet chew formed from a properly-sized chewy sheet cut from the large chewy sheet of FIG. 1 resembling a bone shape. The chewy sheet is rolled and pressed, wrapping in two individual pieces of meat jerky or chicken jerky.
Figure 21:
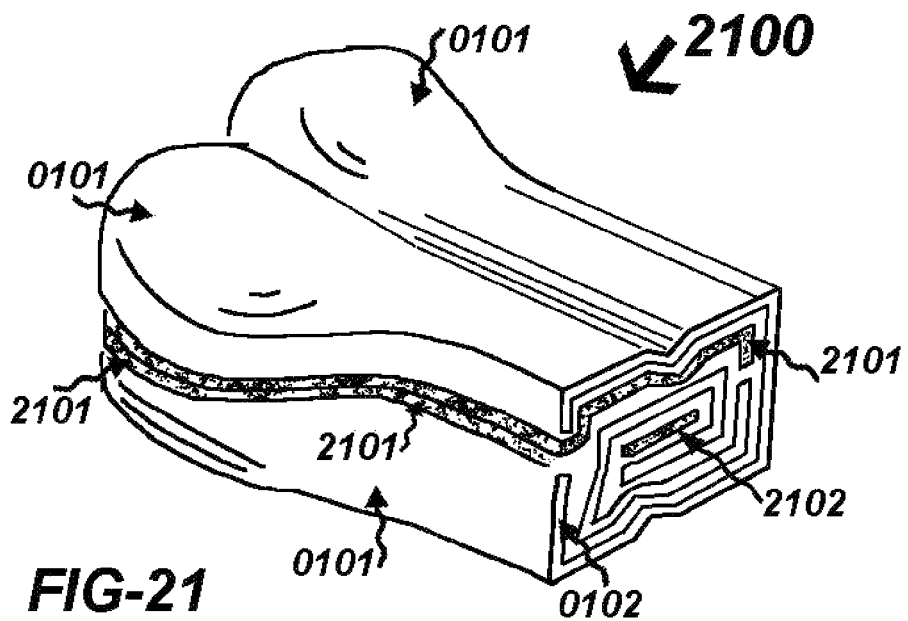
FIG. 21 is a cross-sectional view of the embodiment of FIG. 20

As shown in FIGS. 20 and 21, an embodiment of present invention. An alternate shaped Pet Chew 2000 is formed resembling a bone shape. Processes are, cut a small properly-sized rectangular sheet from Sheet 0100 of FIG. 1. Get two pieces of meat jerky or chicken jerky in proper size 2101 and 2102 as shown in FIGS. 20 and 21 ready. Put said jerky on the small sheet cut from sheet 0100. Roll the small sheet together with the jerky to make a cylindrical stick wrapping 2101 and 2102 in. Put the rolled stick into a BONE-shaped-cavity pressing mold and then press it making the product in a shape of bone. The aim of pressing is to make the product in a permanent structure and longer-lasting chewing for pets. The cross-sectional view of the product is as shown in 2100 of FIG. 21 where the two pieces of jerky are located. A small part of both two jerky may be exposed as shown in FIG. 20 or not be exposed.

Figure 22:
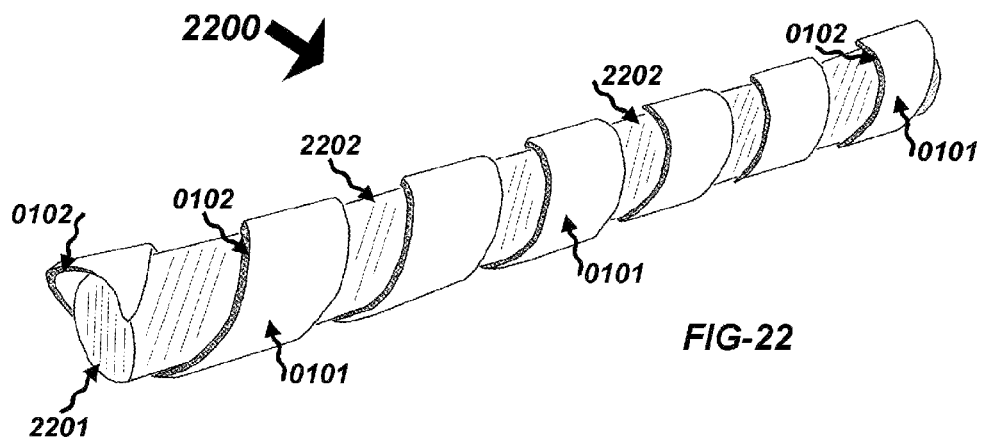
FIG. 22 is an elevational view of another embodiment of a pet chew formed from a properly-sized chewy sheet cut from the large chewy sheet of FIG. 1. The chewy sheet is twisted, wrapping in a stick-shaped "edible chewable material" of chicken liver and potato starch composition appealing to pets.

As shown in FIG. 22, an embodiment of present invention. An alternate shaped Pet Chew 2200 is formed looking like a stick. Processes are, cut a small properly-sized rectangular sheet from "meat based" Sheet 0100 of FIG. 1. Get a dried extruded edible stick 2202 made of a composition comprising chicken liver and potato starch ready. Wrap the stick 2202 longitudinally with the "meat based" small sheet by twisting the small sheet. 2201 in this figure is an end of stick 2202.

It is foreseen that within said aspect of present invention, a pet chew in a pattern may have more than one layer (for example more than one layer of 0100 or 0200) in the outer sheet. And Sheet 0100 and 0200 may have several layers in the sheet itself. It is also foreseen that the small sheet cut from initial sheet 0100 used to the final products may have various shapes.

Here is another aspect of present invention with embodiments of pet chews developing from within the scope and spirit of present invention showed in FIG. 23 to FIG. 26. Different from said "meat based chewy SHEET wrapping an edible material in", the embodiments of this aspect is, a THREE-DIMENSIONAL-SHAPE meat based chewy mass member with another member formed by one individual chunk or some individual chunks of "edible chewable material" positioned in, distributed in or wrapped by said chewy mass. Said three-dimensional-shape chew mass member serves as main body or outer shell/casing of this pet chew. Said "edible chewable material" is totally covered by said chew mass without exposure or partially exposed.

It should be noted that, formula of said chew mass under this aspect of present invention is the same as the formula of said "meat based" chewy sheet as mentioned above.

Figure 23:
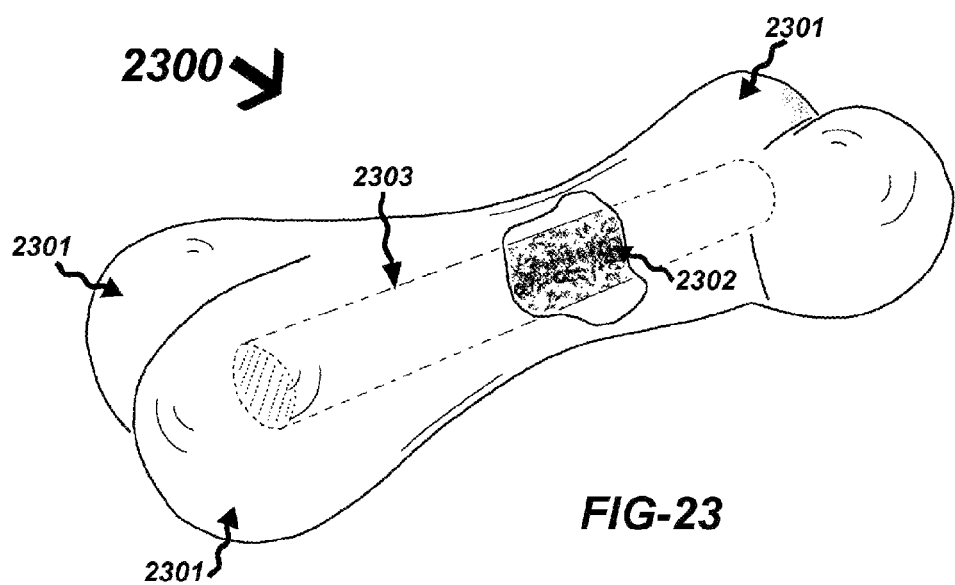
FIG. 23 is a perspective view of an embodiment of a pet chew formed from a member of three-dimensional-shape chewy mass resembling a bone shape, and another member of chicken jerky chunk in stick shape wrapped in said chewy mass.

As shown in FIG. 23, an embodiment of present invention. An alternate shaped Pet Chew 2300 is formed looking like a bone. Processes are, form an outer three-dimensional-shaped shell/casing 2301 with "meat based" material by pressing molding, extrusion, co-extrusion or injection-molding. The outer shell/casing has a cavity 2303. One or a few pieces of meat jerky or chicken jerky 2302 are wrapped in 2301 by filling the cavity 2303 with 2302. Compared to said "meat based chewy mass", dogs are attacked more by the jerky 2302 wrapped in but they must chew on the outer chewy mass 2301 and ingest 2301 to reach the jerky 2302. In this pattern, the pet chew under this aspect will provide consistent appealing to dogs during their whole chewing time.

Figure 24:
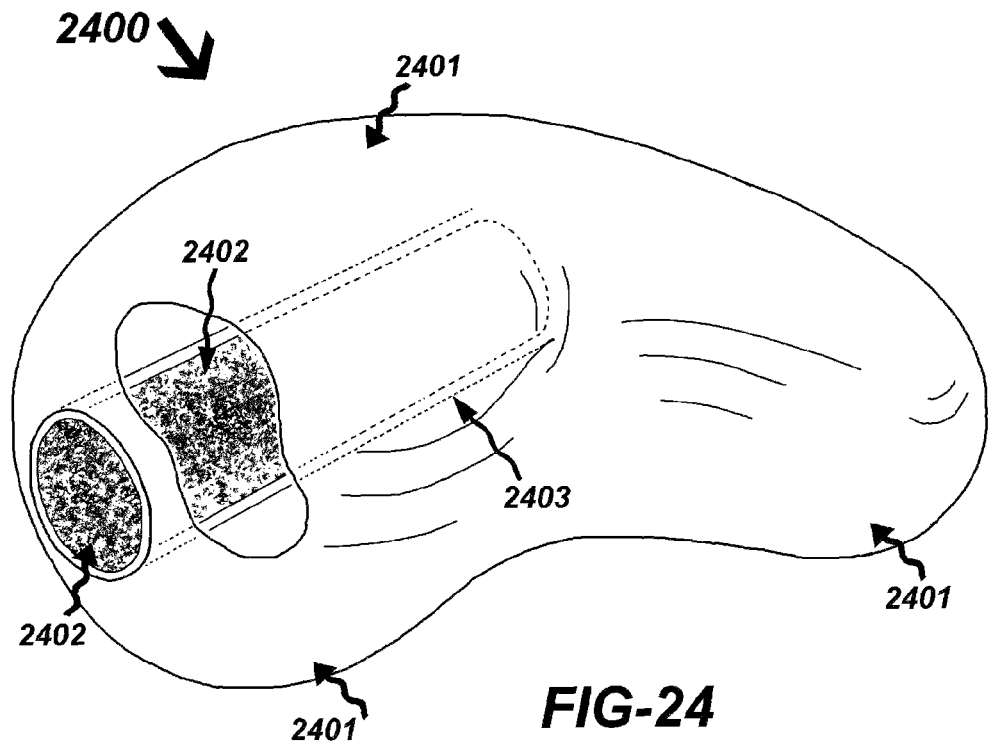
FIG. 24 is a perspective view of an embodiment of a pet chew formed from a member of three-dimensional-shape chewy mass resembling a pea shape, and another member of chunk of beef-flavored chewable material in stick shape wrapped in said chewy mass.

As shown in FIG. 24, an embodiment of present invention. An alternate shaped Pet Chew 2400 is formed looking like a pea. Processes are, form an outer three-dimensional-shaped shell/casing 2401 with "meat based" material by pressing molding, extrusion, co-extrusion or injection-molding. The outer shell/casing has a cavity 2403. Get a stick-shaped beef-flavored "edible chewable material" 2402 ready. Assemble said stick 2402 into the cavity 2403 so that 2402 is wrapped in casing 2401.

Figure 25:
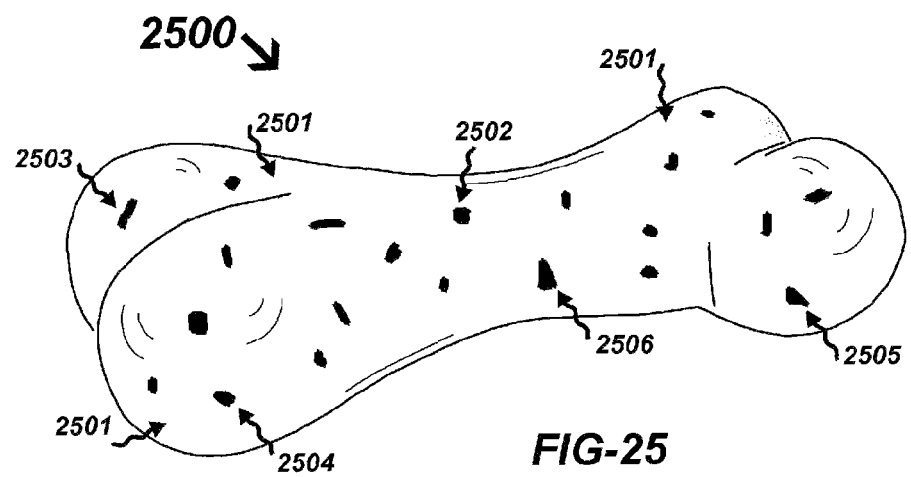
FIG. 25 is a elevational view of an embodiment of a pet chew formed from a member of three-dimensional-shape chewy mass resembling a bone shape, and another member of a number of chicken jerky chunks distributed in said chewy mass.
Figure 26:
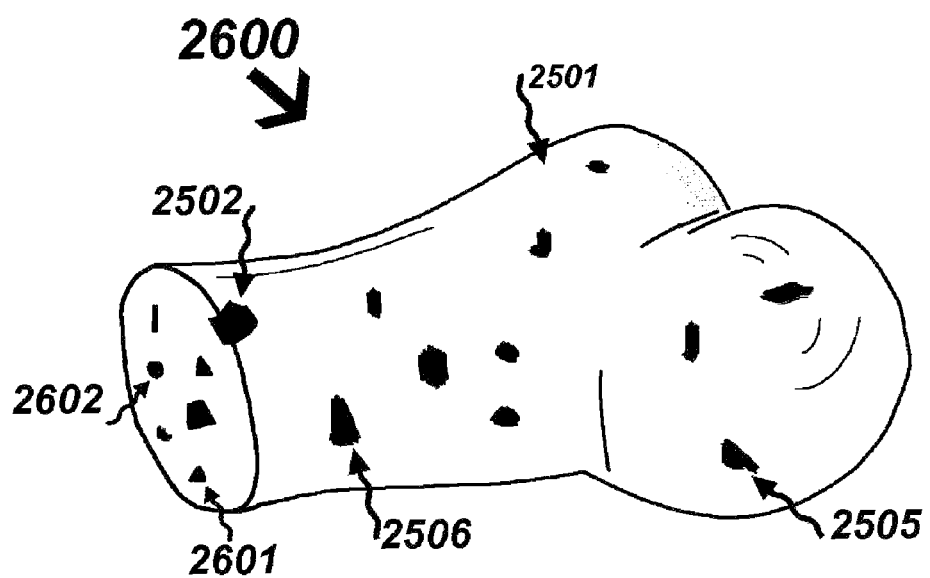
FIG. 26 is cross-sectional view of the embodiment of FIG. 25

As shown in FIG. 25 and FIG. 26, an embodiment of present invention. An alternate shaped Pet Chew 2500 is formed looking like a bone. Processes are, get meat based material composition 2501 which is in wet status ready. Get a number of small dried chicken jerky chunks with representatives of 2502, 2503, 2504, 2505 and 2506 ready. Blend 2501 with said chicken jerky chunks together to a blend. Form a bone shape with said blend by pressing molding, extrusion, co-extrusion or injection-molding. Dry the bone shape blend by heating so as to form a pet chew 2500. By said blending and molding, chicken jerky chunks thus are positioned and distributed in chewy mass 2501. Chicken jerky chunks 2601 and 2602 of 2600 are also representatives of the chicken jerky chunks which are distributed in chewy mass 2501.

In present invention, a meat based material is used to create a chewy sheet to form pet chews that existing known rawhide/porkhide can make. The spirit of present invention is that, the meat based material chewy sheet simulates the property and function of existing rawhide or plant based material to form a pet chew. By doing this, rawhide/porkhide is substituted perfectly by the chewy sheet under present invention when making pet chew products. Compared to rawhide/porkhide, one advantage of meat based material sheet is that, it is obviously extremely more attractive and appetizing for dogs, which urges them to chew. Another advantage is that, the raw material of meat based material does not have the potentially health-harmful residue that rawhide in the finished products has. And a third advantage is, producing the raw material of meat based material is environment-friendly and will not pollute the environment and water system, but producing the raw material of rawhide is known to generate evident pollution risk during its splitting, cleaning, washing and bleaching processes. A forth advantage is, meat based material has more inherent nutrition than rawhide/porkhide or plant based materials as well.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An edible pet chew, comprising:
 a chewy sheet of meat based material, wherein said meat based material comprises a meat ingredient and a non-meat ingredient mixed with said meat ingredient, wherein said meat ingredient, in weight proportion of said meat based material, is at least ⅓, wherein said non-meat ingredient comprises an additive, wherein said additive is used to provide said meat based material sufficient rigidity and strength after said chewy sheet is dried via a drying process so as to make said chewy sheet be chewy for pets to chew on, wherein said additive comprises a plant ingredient, wherein said plant ingredient is less than 50% by weight in said meat based material.

2. The edible pet chew, as recited in claim 1, wherein said plant ingredient is selected from a group consisting of a plant material, a plant derived material, a plant protein and a plant starch.

3. The edible pet chew, as recited in claim 2, wherein said additive further comprises an element selected from a group consisting of a thickener, a humectant, a stabilizer, an emulsifier, a gelatinizer binder and a filler, so as to further provide said meat based material sufficient rigidity and strength after said drying process with the purpose of making said chewy sheet be chewy for pets to chew on.

4. The edible pet chew, as recited in claim 1, wherein said meat based material further comprises an ingredient of ground rawhide, wherein said ground rawhide is less than 5% by weight in said meat based material.

5. The edible pet chew, as recited in claim 3, wherein said meat based material further comprises an ingredient of ground rawhide, wherein said ground rawhide is less than 5% by weight in said meat based material.

6. The edible pet chew, as recited in claim 3, wherein said meat based material is free of rawhide.

7. The edible pet chew, as recited in claim 3, wherein said thickener is selected from a group consisting of glucose syrup, malt syrup, soy protein Isolate, wheat protein isolate, corn protein isolate, artemisia gum, linseed gum, deacetylated chitin, pectins, sodium alginate, xanthan gum, carrageenan, phosphated distarch phosphate, sodium lactate, diacetyl tartaric acid ester of mono(di)glycerides (DATAE), sesbania gum, polyglycerol esters of fatty acid (polyglycerol monostearate, polyglycerol monooleate), maltitol, sorbitol, propylene glycol, ablmoschus manihot gum, β-cyclodextrin, arabic gum, starch acetate, guar gum, potassium alginate, carob bean gum, gellan gum, sodium polyacrylate, distarch phosphate, gelatin, hydroxypropyl, distarch phosphate, hydroxypropyl methyl cellulose, agar, acid treated starch, sodium carboxy methyl cellulose, oxidized starch and oxidized hydroxypropyl starch;
 wherein said humectant is selected from a group consisting of soy protein Isolate, wheat protein isolate, corn protein isolate, glucose syrup, malt syrup, sodium pyrophosphate, trisodium orthophosphate, sodium hexametaphosphate, sodium tripolyphosphate, phosphoric acid, calcium dihydrogen phosphate, sodium lactate, maltitol, sorbitol, propylene glycol, glycerin, sodium dihydrogen phosphate, sodium phosphate dibasic, potassium lactate, sodium lactate, acetylated distarch phosphate and acetylated distarch adipate;
 wherein said stabilizer is selected from a group consisting of trisodium orthophosphate, potassium sorbate, sodium stearoyl lactylate, calcium stearoyl lactylate, phosphoric acid, hydroxypropyl starch, pectins, xanthan gum, carrageenan, sodium lactate, polyglycerol esters of fatty acid (polyglycerol monostearate, polyglycerol monooleate), maltitol, sorbitol, propylene glycol, propylene glycol esters of fatty acid, and glucono delta-lactone;
 wherein said emulsifier is selected from a group consisting of soy protein Isolate, wheat protein isolate, corn protein isolate, Sucrose esters of fatty acid, sodium hexametaphosphate, sodium stearoyl lactylate, calcium stearoyl lactylate, hydroxypropyl starch, pectins, carrageenan, diacetyl tartaric acid ester of mono(di)glycerides (DATAE), polyglycerol esters of fatty acid (polyglycerol monostearate, polyglycerol monooleate), maltitol, sorbitan monolaurate, sorbitol, propylene glycol, propylene glycol esters of fatty acid, polyoxyethylene xylitan monostearate, tripolyglyceryl monostearate, potassium stearate, mono-(di-,tri-)glycerides of fatty acids, modified soybean phospholipid, sodium caseinate, citric and fatty acid esters of glycerol, lactic and fatty acid esters of glycerol, sodium starch octenyl succinate and acetylated mono and diglyceride (acetic and fatty acid esters of glycerol);
 wherein said gelatinizer is selected from a group consisting of soy protein Isolate, wheat protein isolate, corn protein isolate, propylene glycol and glucono delta-lactone;
 wherein said binder is selected from a group consisting of glutinous rice flour, gelatin, linseed gum, pectins, xanthan gum, carrageenan, sesbania gum, maltitol, sodium alginate, ablmoschus manihot gum, arabic gum, guar gum, Carob bean gum, gellan gum and agar;
 wherein said filler is selected from a group consisting of plant material, plant derived material, plant protein and plant starch.

8. The edible pet chew, as recited in claim 1, further comprising a member of an edible chewable material, wherein said edible chewable material is wrapped or positioned in said chewy sheet to further enhance attraction or nutrition of said edible pet chew for pets, wherein said edible chewable material wrapped in said chewy sheet is totally covered by said chewy sheet without exposure or is partially covered with exposure.

9. The edible pet chew, as recited in claim 5, further comprising a member of an edible chewable material, wherein said edible chewable material is wrapped or positioned in said chewy sheet to further enhance attraction or nutrition of said edible pet chew for pets; said edible chewable material wrapped in said chewy sheet is covered by said chewy sheet without exposure.

10. The edible pet chew, as recited in claim 5, further comprising a member of an edible chewable material, wherein said edible chewable material is wrapped or positioned in said chewy sheet to further enhance attraction or nutrition of said edible pet chew for pets; said edible chewable material wrapped in said chewy sheet is partially covered with exposure.

11. The edible pet chew, as recited in claim 9, wherein said edible chewable material is selected from a group consisting of dried or cured animal meat, chicken, pork, beef, duck meat, goose, turkey meat, poultry meat, fish, animal pizzle, animal viscera, animal liver, animal lung, animal heart, animal fat, fruit, dried vegetable, carrot, sweet potato, biscuit, meat jerky and chicken jerky.

12. The edible pet chew, as recited in claim 10, wherein said edible chewable material is selected from a group consisting of dried or cured animal meat, chicken, pork, beef, duck meat, goose, turkey meat, poultry meat, fish, animal pizzle, animal viscera, animal liver, animal lung, animal heart, animal fat, fruit, dried vegetable, carrot, sweet potato, biscuit, meat jerky and chicken jerky.

13. The edible pet chew, as recited in claim 3, wherein said chewy sheet is folded or rolled longitudinally to a folded sheet that is knotted at first and second longitudinal ends, wherein said first and second longitudinal ends having knots therein.

14. The edible pet chew, as recited in claim 9, wherein said chewy sheet is folded or rolled longitudinally to a folded sheet that is knotted at first and second longitudinal ends, wherein said first and second longitudinal ends having knots therein.

15. The edible pet chew, as recited in claim 10, wherein said chewy sheet is folded or rolled longitudinally to a folded sheet that is knotted at first and second longitudinal ends, wherein said first and second longitudinal ends having knots therein.

16. The edible pet chew, as recited in claim 1, wherein said non-meat ingredient consisting of one or more various individual non-meat ingredients, wherein said meat ingredient is the largest ingredient by weight in said meat based material compared with any one of said individual non-meat ingredients.

17. The edible pet chew, as recited in claim 3, wherein said meat ingredient in said meat based material is 50% to 95% by weight.

18. The edible pet chew, as recited in claim 1, wherein said meat ingredient in the weight proportion of said meat based material is larger than the total weight of said plant ingredient.

19. The edible pet chew, as recited in claim 1, wherein said chewy sheet is formed from extruded said meat based material.

\* \* \* \* \*

UNITED STATES PATENT AND TRADEMARK OFFICE
CERTIFICATE OF CORRECTION

PATENT NO. : 8,776,728 B2
APPLICATION NO. : 13/052113
DATED : July 15, 2014
INVENTOR(S) : Guangqiang Xu It is certified that error appears in the above-identified patent and that said Letters Patent is hereby corrected as shown below:

On the Title Page

Item (73), the Name of Assignee: "Shanghai Sunlight Electric Weighing Apparatus Co., Ltd." should read -Shanghai Sunlight Electronic Weighing Apparatus Co., Ltd.-.

Signed and Sealed this
Twentieth Day of August, 2019

Andrei Iancu
*Director of the United States Patent and Trademark Office*